United States Patent [19]
MacIntosh, Jr. et al.

[11] Patent Number: 5,872,612
[45] Date of Patent: Feb. 16, 1999

[54] DUAL-PURPOSE NOSE PAD INSERT ASSEMBLY

[75] Inventors: Charles M. MacIntosh, Jr., Middleboro, Mass.; Robert J. Woyton, Providence, R.I.

[73] Assignee: The Hilsinger Company LP, Plainville, Mass.

[21] Appl. No.: 6,263

[22] Filed: Jan. 13, 1998

[51] Int. Cl.⁶ ............................. G02C 5/12; G02C 1/00
[52] U.S. Cl. ..................... 351/138; 351/78; 351/80; 351/136
[58] Field of Search ..................... 351/136, 138, 351/137, 139, 78, 80, 81, 82, 41

[56] References Cited

U.S. PATENT DOCUMENTS

| | | |
|---|---|---|
| 1,808,448 | 6/1931 | Baker . |
| 4,681,411 | 7/1987 | Taddei ................................. 351/137 |
| 4,904,076 | 2/1990 | Kappler et al. ..................... 351/138 |
| 5,457,506 | 10/1995 | Winkler ............................... 351/137 |

FOREIGN PATENT DOCUMENTS

| | | |
|---|---|---|
| 80 22425 | 4/1982 | France . |
| 2835116A1 | 2/1980 | Germany . |
| 2732860C3 | 1/1981 | Germany . |
| 2712897C2 | 9/1981 | Germany . |
| 3303749A1 | 9/1984 | Germany . |

OTHER PUBLICATIONS

Hilco 1993 Optical Products Catalog, pp. 36, 38.

*Primary Examiner*—Hung X. Dang
*Attorney, Agent, or Firm*—Barlow & Josephs, Ltd.

[57] ABSTRACT

A dual-purpose nose pad insert assembly is provided. The dual-purpose nose pad insert assembly includes an upper post connected to a pad substrate where the post includes an aperture proximal to its free end as well as a pair of detent channels on its opposing sides. A lower removable post is connected to the pad substrate as well and also includes a pair of detent channels disposed on respective sides thereof. The nose pad insert with both posts can accommodate a push-on pad arm assembly on an eyeglass eyewire. To accommodate a post and screw pad arm assembly, the lower post is snapped off and removed to leave the upper post and its aperture therethrough remaining for installation into a post and screw pad arm assembly.

11 Claims, 9 Drawing Sheets

DUAL-PURPOSE NOSE PAD INSERT ASSEMBLY

BACKGROUND OF THE INVENTION

The present invention relates generally to a nose pad insert assembly for eyeglass eyewires. More specifically, the present invention relates to a dual-purpose nose pad assembly for connecting to either a push-on type pad arm assembly or a post and screw type nose pad arm assembly.

In the optical and eyeglass field, it has been well known to employ nose pad inserts in the construction of the eyeglass eyewires for use by customers. Eyeglasses typically include two eyewires, each holding a lens, a bridge as well as two temples to engage with the ears of a wearer. Most importantly, a nose pad is secured to each of the eyewires of the eyeglasses to cushion the eyeglasses on the wearer's nose and to provide alignment for the eyeglass lenses. In the optical industry, there are many types of eyeglass eyewires, temples and nose pad assemblies. In particular, there are several types of nose pad arm assemblies which provide the interconnection between the nose pad insert itself and the individual eyeglass eyewires. The two most common types of pad arm assemblies are the push-on pad arm assembly and the post and screw type assembly. These pad arm assemblies are typically permanently affixed to the particular eyeglass eyewire at hand thus requiring, for the life of the eyeglass eyewire, a particular type of nose pad insert for use. As a result, the proper type of nose pad insert must be employed during eyeglass repair to accommodate the particular type of nose pad arm assembly on the eyeglasses.

As a result of the requirement of use of a particular type of nose pad insert for a particular pad arm assembly, an eyeglass repairer, such as an optician, must keep both types of nose pad insert assemblies in stock to accommodate both possible pad arm assemblies on eyeglasses that may need repair. Furthermore, the two types of pad arm assemblies significantly decreases the ability of a customer to easily select the preferred type of nose pad insert. For example, the customer may prefer a particular type of insert but the eyeglasses at hand include a pad arm assembly which is incompatible with the selected nose pad insert.

In view of the foregoing, there is a significant disadvantage to the multiple pad arm and nose pad insert constructions in that they are incompatible with one another and require that both types must be kept in inventory to accommodate both types of pad arm assemblies on eyeglasses. Due to the demand for a single pad arm and nose pad insert which has a universal-type construction, it is desirable for a nose pad insert to be easily customizable to both a push-on type pad arm assembly and a post and screw type assembly which are the most common pad arm assemblies in the optical industry. It is also desirable for a nose pad insert to be easily customizable to the particular pad arm assembly at hand. In addition, it is desirable that the nose pad insert be capable of functioning in a normal fashion despite being previously customized.

SUMMARY OF THE INVENTION

The present invention preserves the advantages of prior art nose pad insert assemblies for eyeglasses. In addition, it provides new advantages not found in currently available nose pad insert assemblies, and overcomes many disadvantages of such currently available nose pad inserts. The invention is generally directed to a novel and unique dual-purpose insert assembly for eyeglass pad arm assemblies with particular application in accommodating pad arm assemblies of different types. The dual-purpose insert assembly for eyeglass pad arm assemblies has particular application in accommodating pad arm assemblies of different types. The dual-purpose nose pad insert of the present invention enables a single nose pad insert assembly to be capable of accommodating both a push-on pad arm assembly as well as a post and screw pad arm assembly with simple and quick customization without the need for additional tools.

The preferred embodiment of the present invention includes three primary members. A nose pad substrate, having at length including a longitudinal axis with a mounting surface thereon, is provided. A primary post with a opposing first and second side walls is connected to be substantially perpendicular to the mounting surface of the nose pad substrate. The primary post also includes a screw hole proximal to its free end where the hole extends from the first side wall and through the primary post to exit through the second side wall on the opposing side. In addition, at least one channel is provided in the side wall of the primary post and extends in a direction parallel to the longitudinal axis of the nose pad substrate. A secondary post is also connected to the nose pad substrate adjacent to the primary post. The secondary post includes a score which makes it easily removable from the nose pad substrate as desired. The secondary post also includes at least one channel in one of its side walls which is longitudinally aligned with the channel disposed in the primary post.

In operation, the dual-purpose insert of the present invention can be used on an eyeglass eyewire having a push-on pad arm assembly or a post and screw-type assembly. For a push-on post pad arm assembly, both the primary post and the secondary post are inserted into the receptacle box of the push-on pad arm assembly for frictional engagement therewith. The primary post and secondary post act together to substantially fill the receptacle box of the push-on pad arm assembly and receive protrusions in the receptacle box in their respective channels to provide a push-on friction fit while enabling the nose pad insert to move slightly for additional customization on the wearer's nose.

For use in a post and screw pad arm assembly, the secondary post is completely removed or snapped off to leave the primary post emanating from the nose pad substrate. As a result, the aperture in the primary post remains available for receiving a screw after the primary post has been inserted into the post and screw receptacle box. The screw is tightened from the outside in the normal course and the nose pad insert and overall nose pad assembly functions as usual.

It is therefore an object of the present invention to provide a dual-purpose nose pad insert assembly which can accommodate both push-on pad arm assemblies and post and screw pad arm assemblies.

Another object of the present invention is to provide a dual-purpose nose pad insert assembly which can be easily customized without the need for additional tools to accommodate different types of pad arm assemblies on eyeglass eyewires.

It is a further object of the present invention to provide a dual-purpose nose pad insert assembly which, after customized, provides a superior nose pad construction.

It is yet a further object of the present invention to provide a dual-purpose nose pad insert assembly which can be easily manufactured with little additional cost over known single-use assemblies.

It is another object of the present invention to provide a dual-purpose nose pad insert assembly which obviates the need for an eyeglass repairer to stock two versions of the same nose pad to accommodate the two major types of nose pad arm assemblies on the market.

BRIEF DESCRIPTION OF THE DRAWINGS

The novel features which are characteristic of the present invention are set forth in the appended claims. However, the inventions preferred embodiments, together with further objects and attendant advantages, will be best understood by reference to the following detailed description taken in connection with the accompanying drawings in which:

DETAILED DESCRIPTION OF THE PREFERRED EMBODIMENT

Figure 1:
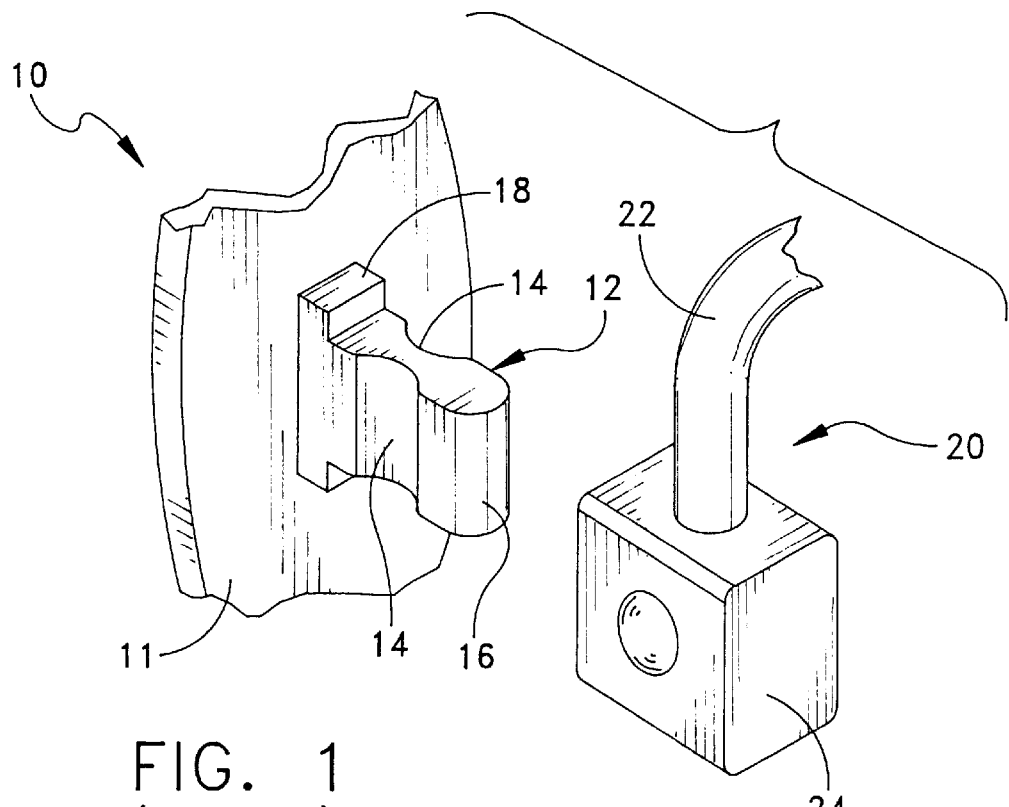
FIG. 1 is a perspective view of a prior art push-on pad arm assembly and corresponding nose pad insert.

Referring to FIG. 1, a perspective view of a prior art push-on pad arm and nose pad insert assembly is shown. In particular, prior art push-on insert 10 is shown with nose pad substrate 11 with a post base 18 affixed thereto. Post 12 includes free end post end tip 16 and detents or channels 14 residing on opposing sides of post 16.

Figure 2:
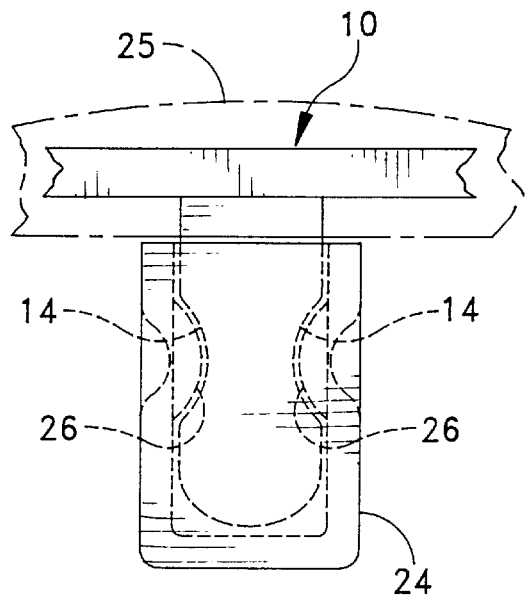
FIG. 2 is a top view of an assembled prior art push-on pad arm and nose pad insert assembly of FIG. 1.

FIG. 2 illustrates a top view of an assembled push-on pad assembly of FIG. 1 where, when viewed in conjunction with FIG. 1, push-on pad arm assembly 20 is provided with pad arm 22 and post receptacle box 24. Receptacle box protrusions 26 are provided to emanate toward the interior of receptacle box 24 for frictionally engaging with channels 14 on post 12 of push-on insert nose pad assembly 10. A silicone cover 25 may optionally be provided.

Figure 3:
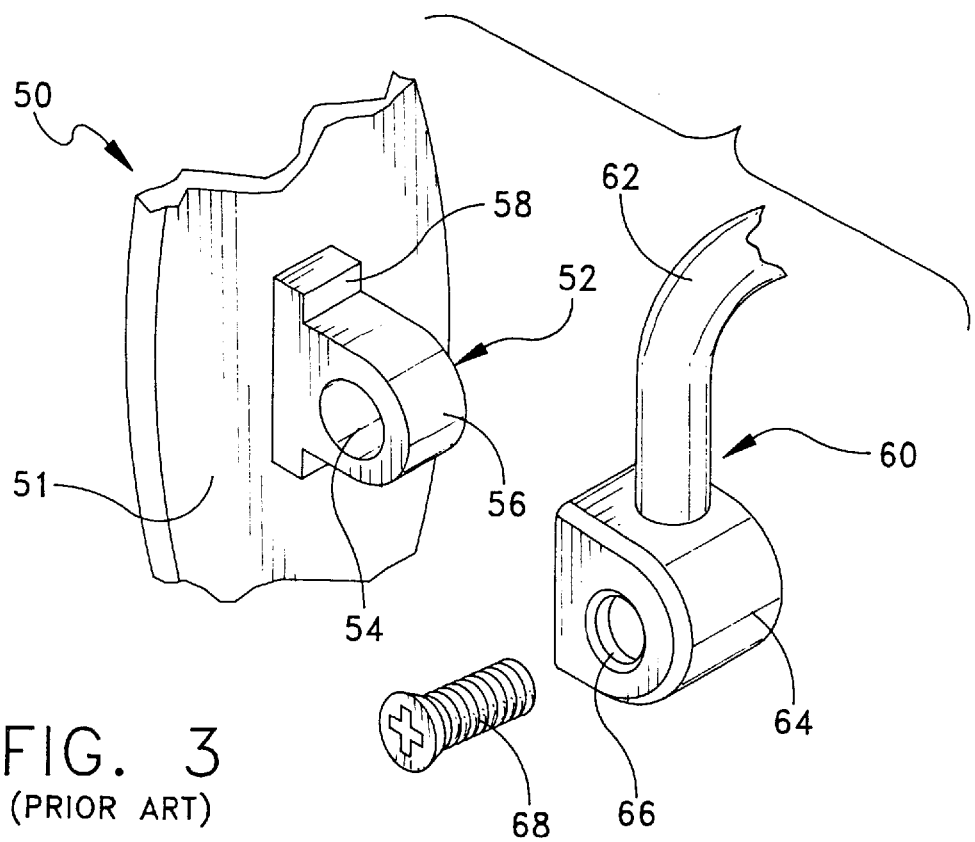
FIG. 3 is a perspective view of a prior art post and screw pad arm and nose pad insert assembly.
Figure 4:
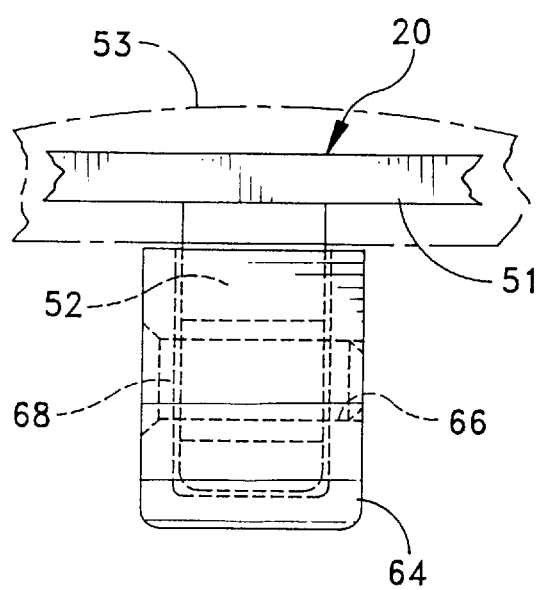
FIG. 4 is a top view of an assembled post and screw pad arm and nose pad insert assembly of FIG. 3.

Turning now to prior art FIGS. 3 and 4, the known prior art post and screw pad arm assembly and nose pad insert is shown. In particular, prior art post and screw insert 50 includes a nose pad substrate 51 with a post 52 having an aperture 54 therethrough. Post 52 is integrally connected to base 58 which is affixed to nose pad substrate 51. Post and screw pad arm assembly 60 is provided with pad arm 62, post receptacle box 64 and threaded aperture 66 for receiving screw 68 therethrough. As best seen in FIG. 4, free end 56 of post 52 is inserted into receptacle box 64 until aperture 54 is coaxial with threaded aperture 66. Upon installation of post 52 into receptacle box 64, screw 68 is threaded through threaded aperture 66 and into aperture 54 to secure post and screw nose pad insert 50 in place.

As can be seen in FIGS. 1 through 4, substantially different types of nose pad insert assemblies are needed to accommodate push-on type pad arm assemblies as compared to post and screw-type assemblies.

Figure 5:
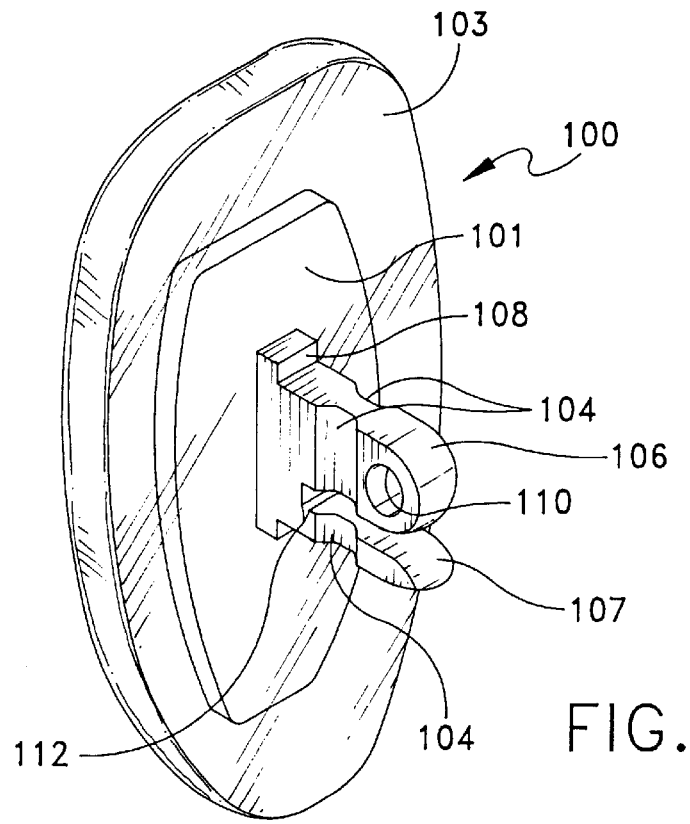
FIG. 5 is a perspective view of the dual-purpose nose pad insert of the present invention.
Figure 6:
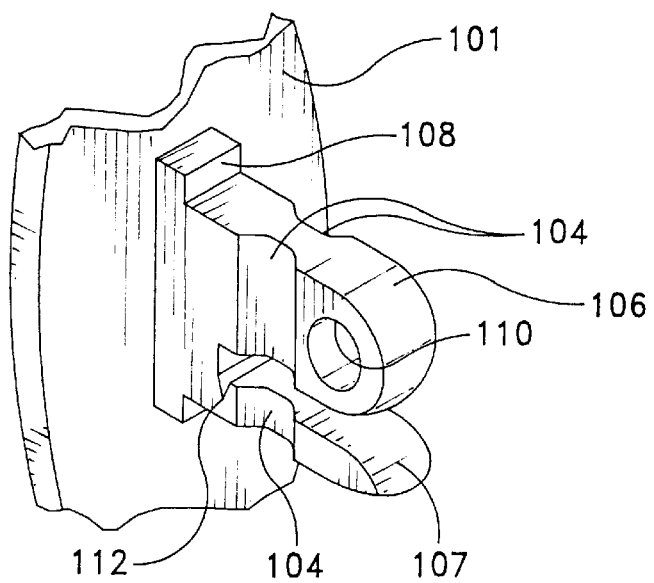
FIG. 6 is a close-up perspective view of the dual-purpose nose pad insert of the present invention.

Referring now to FIGS. 5 through 16, the present invention is shown. Referring first to FIGS. 5 and 6, a nose pad and insert 100 of the present invention is shown to include nose pad substrate 101, a post base 108 which receives upper post 106 and lower post 107 connected directly thereto. Upper post 106 includes detent channels 104 on its opposing sides as well as aperture 110 therethrough at a location proximal to its end not connected to post base 108. While post base 108 is provided, upper post 106 and lower post 107 can be connected and formed directly to nose pad substrate 101.

Further, lower post 107 also includes detent channels 104 on its opposing sides as well as score 112 to facilitate removal of or disconnection of lower post 107 from base 108. As will be described in detail below, lower post 107 must be disconnected from base 108 in order for the dual-purpose nose pad insert assembly of the present invention to accommodate a post and screw pad arm assembly.

Figure 7:
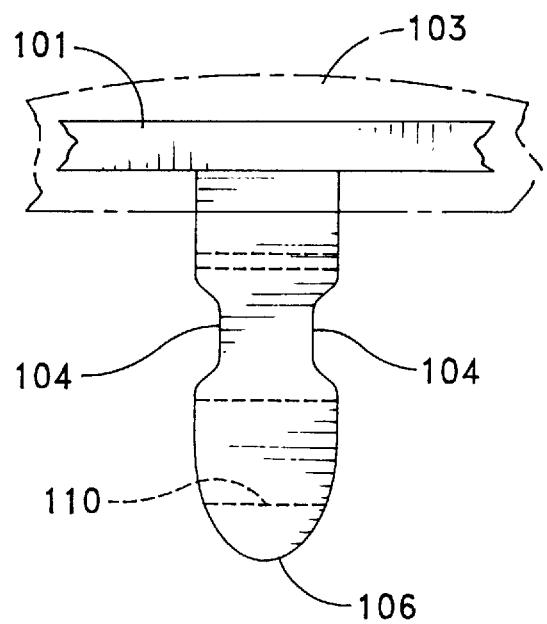
FIG. 7 is a top view of the nose pad insert shown in FIG. 5.
Figure 8:
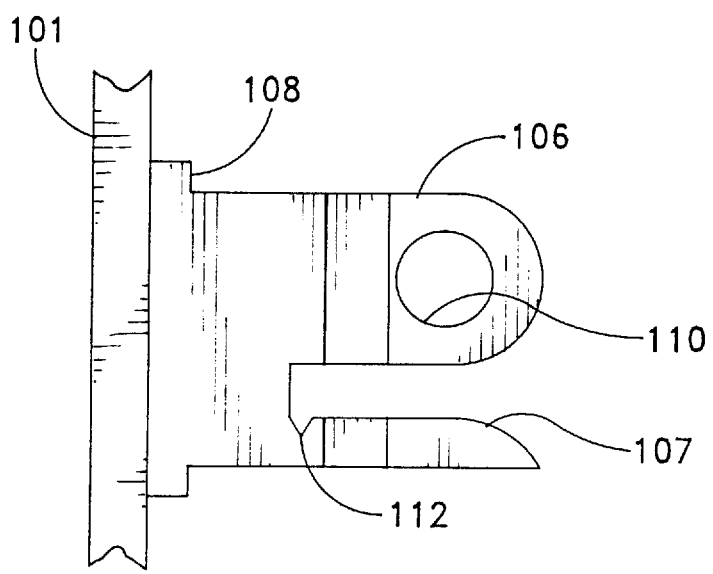
FIG. 8 is a side view of the nose pad insert shown in FIG. 5.

Turning now to FIG. 7, a top view of the present invention is shown to include nose pad substrate 101 which may be optionally covered by silicone cover 103. Detent channels 104 preferably reside on both opposing sides of both the upper post 106 and lower post 107. However, it may be desirable, depending on the configuration of the push-on pad arm assembly, to include detent channels 104 on just upper post 106 or on just lower post 107. Additionally, depending on the configuration of the push-on pad arm assembly, it may be desirable to include detent channels 104 on the left side only or the right side only of upper post 106 and lower post 107, respectively. FIG. 8 further illustrates a side view of the dual-purpose nose pad insert of the present invention as shown in FIG. 5. As a result of the positioning of upper post 106 and lower post 107, as will be described in detail below, a push-on pad arm assembly can be easily accommodated and have its receptacle box substantially filled for a secure and proper fit.

Figure 9:
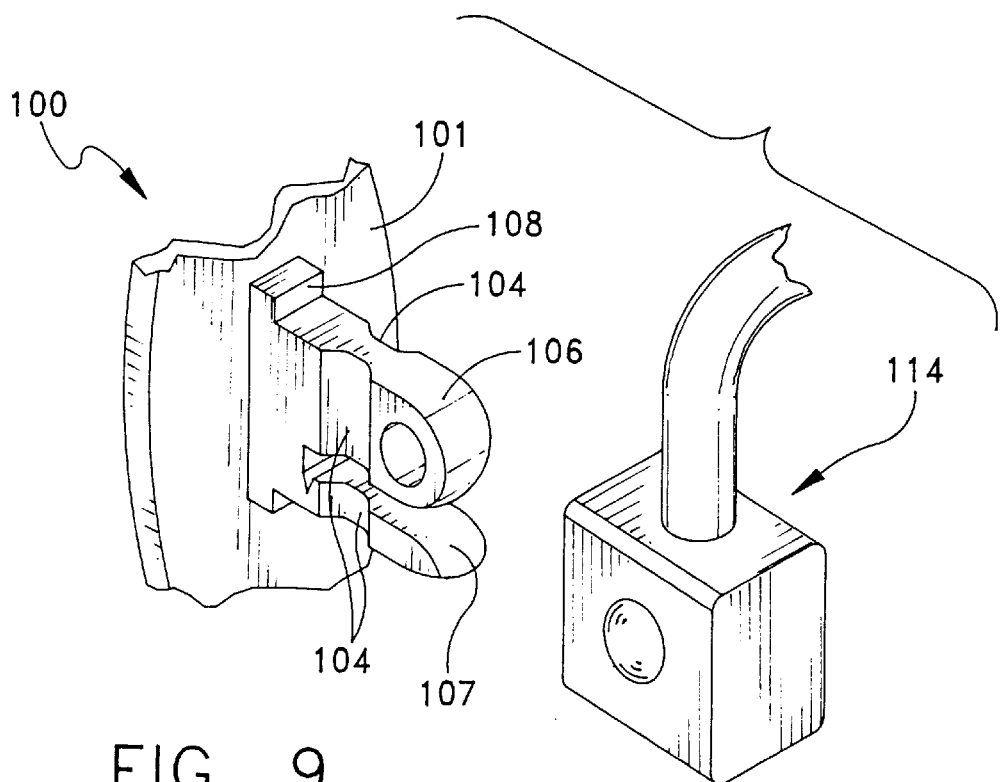
FIG. 9 is a perspective view of the dual-purpose nose pad insert being used with a push-on nose pad arm assembly in accordance with the present invention.
Figure 10:
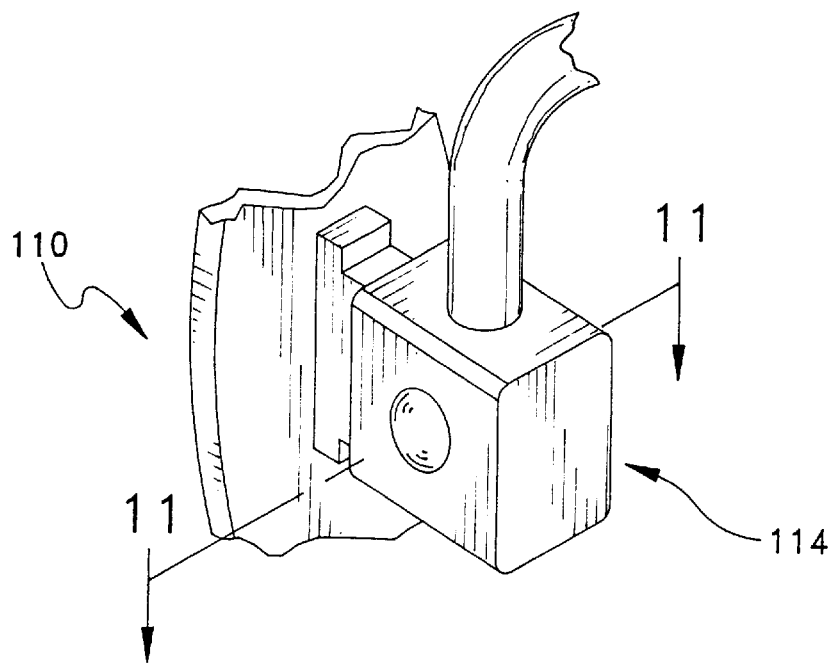
FIG. 10 is a perspective view of the dual-purpose nose pad insert of the present invention installed in a push-on nose pad arm assembly.
Figure 11:
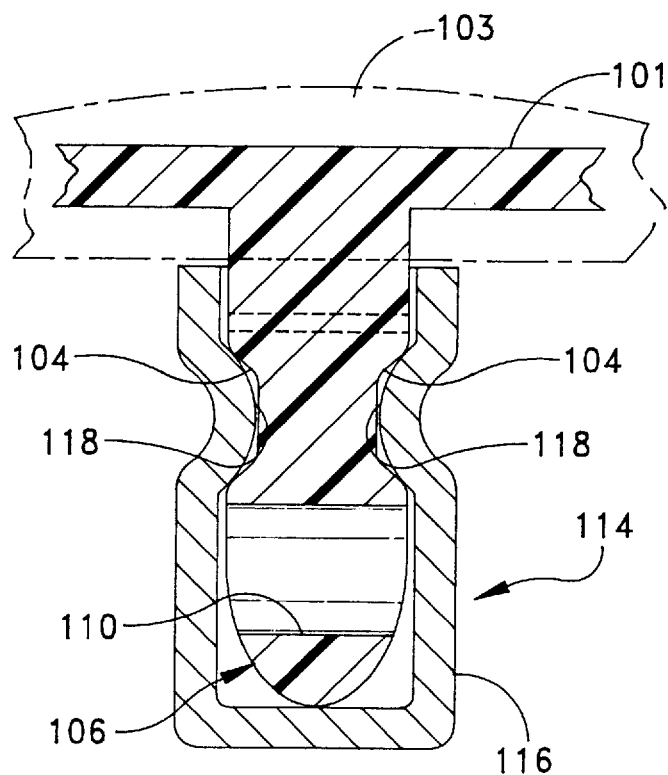
FIG. 11 is a cross-sectional view through line 11—11 of FIG. 10.

Turning now to FIGS. 9–11, the installation and use of the dual-purpose nose pad insert assembly of the present invention to a push-on pad arm assembly is shown. Both upper post 106 and lower post 107 are inserted into push-on receptacle box assembly 114 to provide a snug friction fit, as best seen in FIG. 10. As seen in FIG. 11, a cross-sectional view through the line 11—11 of FIG. 10, upper post 106 resides within push-on receptacle box assembly 114 with its detent channels 104 engaged with receptacle box protrusions 118. Such a configuration allows for an easy snap-on assembly or "push-on" installation. In this configuration, the dual-purpose nose pad insert of the present invention is used in a push-on pad arm assembly and, therefore, aperture 110 in upper post 106 is not employed. Also, it should be noted that the interconnection of lower post 107 to push-on receptacle box assembly 114 is substantially identical to that shown in FIG. 11 for upper post 106. In general, both upper post 106 and lower post 107 are frictionally engaged to receptacle box protrusions 118 via their respective detent channels 104.

Figure 12:
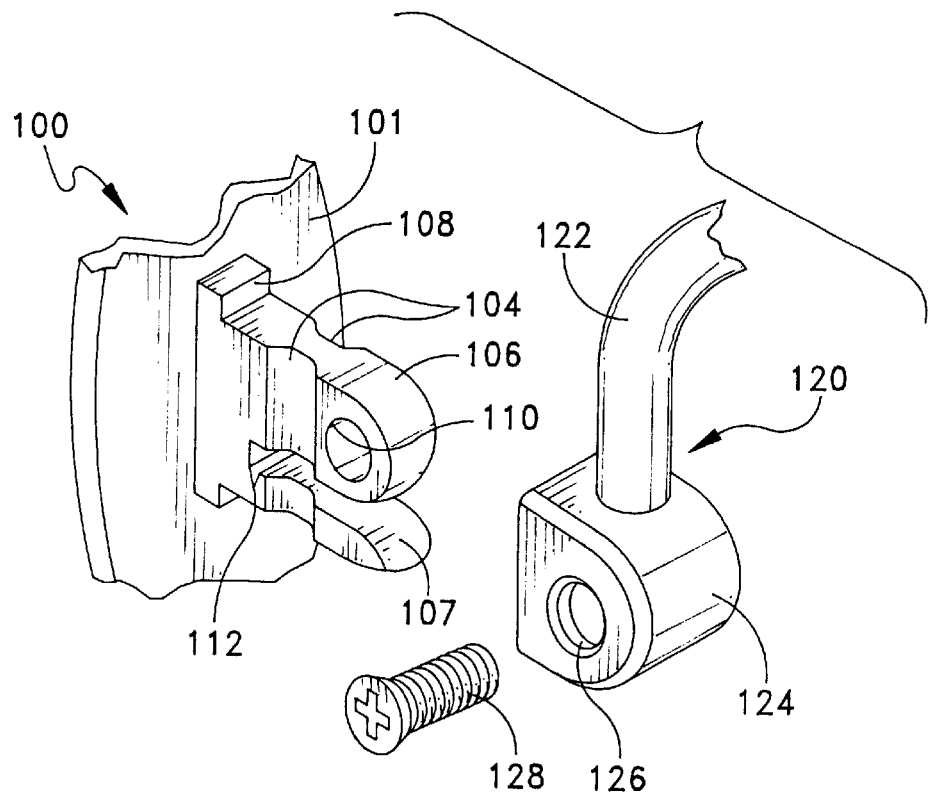
FIG. 12 is a perspective view of the dual-purpose nose pad insert of the present invention in preparation for installation into a post and screw nose pad arm assembly.
Figure 13:
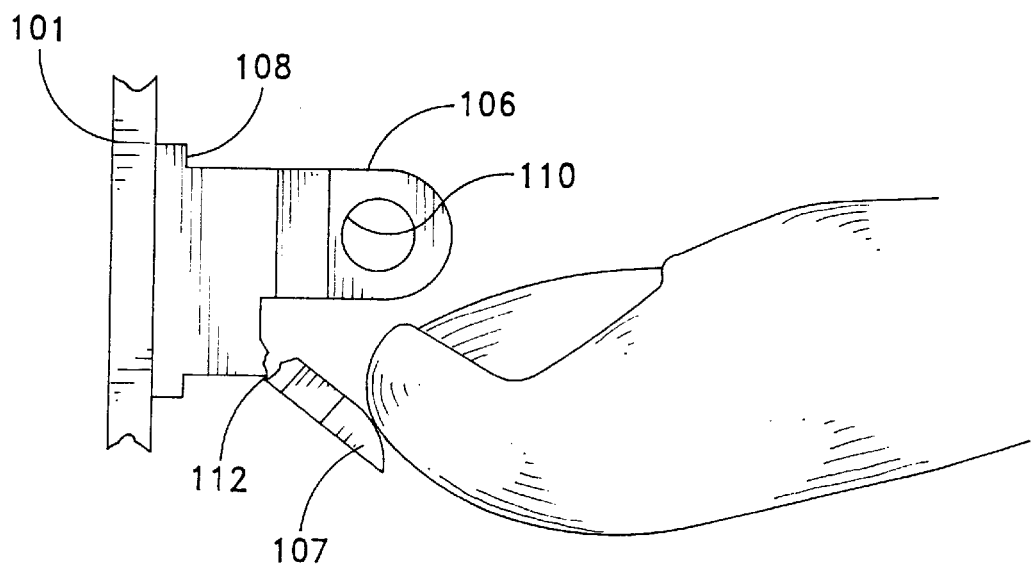
FIG. 13 shows a side view of the dual-purpose nose pad insert of the present invention with the secondary lower post being removed.

Referring now to FIGS. 12–16, use of the dual-purpose nose pad insert assembly of the present invention for a post and screw pad arm configuration is shown. In FIG. 12, an exploded perspective view of the dual-purpose nose pad insert 100 of the present invention in preparation for installation on a post and screw pad arm assembly is shown. To accommodate a post and screw pad arm assembly, lower post 107 must be disconnected or removed because a post and screw receptacle box 124 is smaller than a push-on receptacle box 114 as shown in FIG. 9. As seen in FIG. 13, lower post 107 can be easily snapped off and disconnected by hand or with any other common tool.

Figure 14:
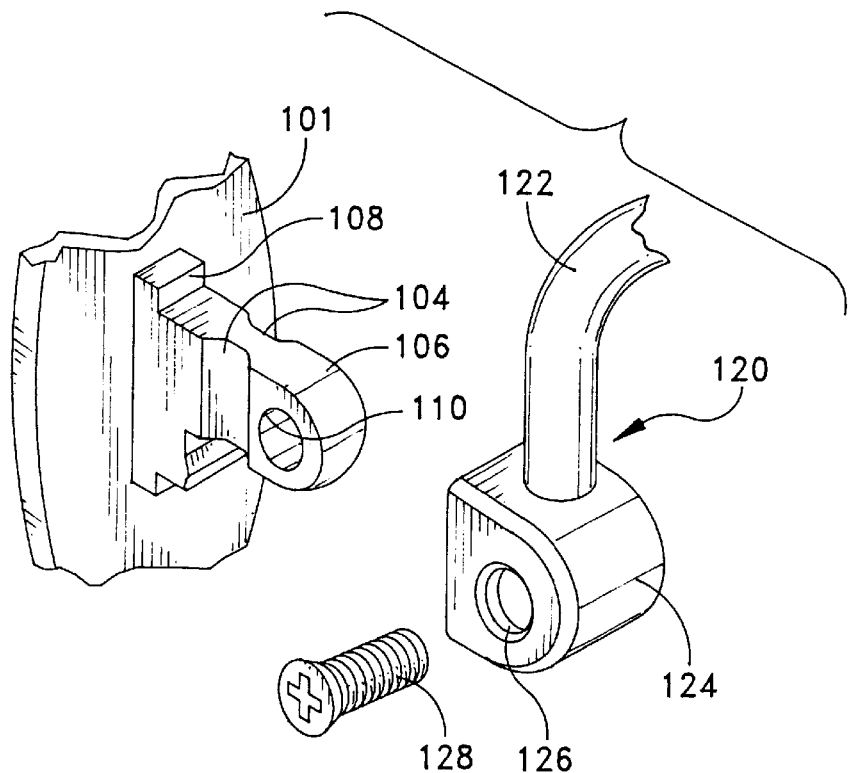
FIG. 14 illustrates a perspective view of the dual-purpose nose pad insert of the present invention with upper primary post remaining in preparation for installation into a post and screw nose pad arm assembly.
Figure 15:
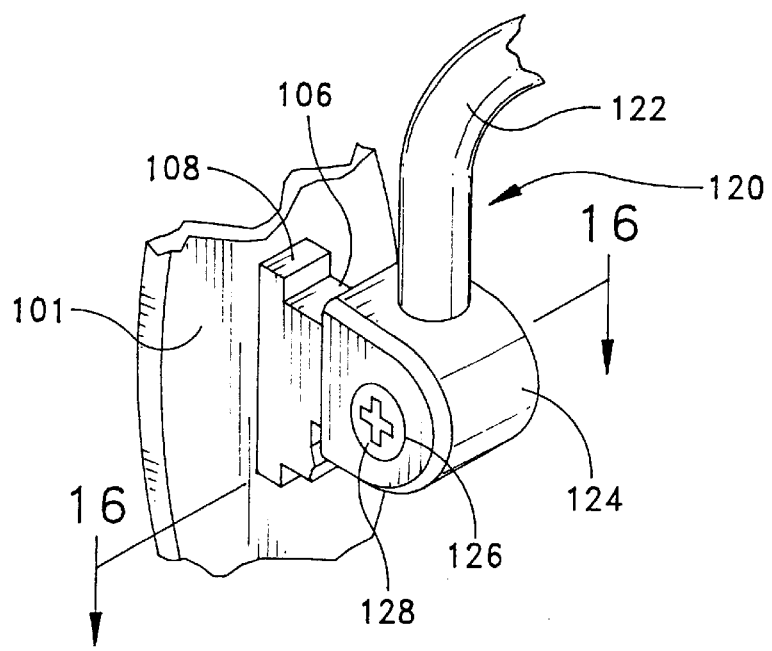
FIG. 15 is a perspective view of a customized dual-purpose nose pad insert installed in a post and screw nose pad arm assembly in accordance with the present invention.
Figure 16:
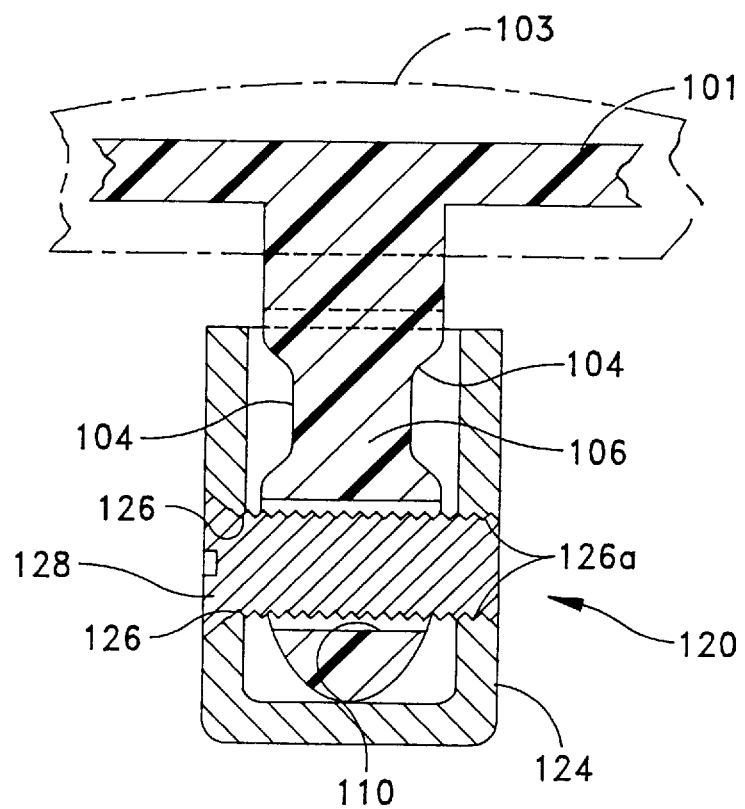
FIG. 16 is a cross-sectional view through the lines 16—16 of FIG. 15.

FIG. 14 now illustrates the dual nose pad insert assembly 100 which has been customized and is in preparation for installation into a post and screw pad arm assembly 120 and, in particular, the post and screw receptacle box 124. FIG. 15 illustrates a perspective view of the customized dual-purpose nose pad insert assembly 100 of the present invention installed on a post and screw pad assembly while FIG. 16 illustrates a cross-sectional view through the line 16—16 of FIG. 15. Referring to both FIGS. 15 and 16, the installation and interconnection of the dual-purpose nose pad insert assembly 100 of the present invention and receptacle box 124 is shown. Upper post 106 is fully inserted into receptacle box 124 so aperture 110 is substantially coaxially aligned with receptacle box aperture 126 and rear receptacle box threaded aperture 126a. With post 106 in place, screw 128 is threadably inserted through aperture 126 into engagement with and through aperture 126a to provide a pivot-like anchor for post 106. It should be noted that detent channels 104 on upper post 106 remain unused when the dual-purpose nose pad insert 100 of the present invention is used on a post and screw nose pad arm assembly.

In general, the dual-purpose nose pad insert 100 of the present invention can be manufactured of plastic or other materials common to the optical industry, such as silicone. It is also possible to make the dual-purpose nose pad insert 100 of the present invention out of metallic materials. It is preferred that base 108 be provided; however, upper post 106 and lower post 107 may be affixed directly to nose paid substrate 101. While it is preferred that upper post 106, lower post 107, base 108 and substrate 101 be integrally formed from a single mold, it is possible to construct the dual-purpose nose pad assembly 100 of the present invention from separate component parts.

It would be appreciated by those skilled in the art that various changes and modifications can be made to the illustrated embodiments without departing from the spirit of the present invention. All such modifications and changes are intended to be covered by the appended claims.

What is claimed is:

1. A dual-purpose nose pad insert assembly for connecting to a nose pad arm assembly of an eyeglass eyewire, comprising:

a nose pad substrate;

an upper post having an outer surface, a first end and a second end defining an upper post length with a width thereacross, said first end of said upper post connected to said pad substrate; said upper post including an aperture at least partially through said width of said upper post; said upper post further defining a transverse upper channel in said outer surface of said upper post extending across said width of said upper post;

a lower post having an outer surface, a first end and a second end defining a lower post length with a width thereacross, said first end of said lower post connected to said pad substrate proximal to said first end of said upper post; said lower post further defining a transverse lower channel in said outer surface of said lower post extending across said width of said lower post; said upper channel and said lower channel being substantially aligned longitudinally aligned with each other; said lower post being removably connected to said pad substrate; and whereby said upper post and said lower post are capable of securely residing within a receptacle box of a push-on friction fit nose pad arm assembly of an eyeglass eyewire and said upper post is capable of securely residing within a receptacle box of a post and screw nose pad arm assembly of an eyeglass eyewire after said lower post has been disconnected from said pad substrate.

2. The dual-purpose nose pad insert assembly of claim 1, further comprising:

a silicone cover positioned about said pad substrate.

3. The dual-purpose nose pad insert assembly of claim 1, wherein said nose pad substrate is substantially planar.

4. The dual-purpose nose pad insert assembly of claim 1, wherein said nose pad insert assembly is manufactured of plastic.

5. A dual-purpose nose pad insert assembly for connecting to a nose pad arm assembly of an eyeglass eyewire, comprising:

a nose pad substrate having a length including a longitudinal axis with a mounting surface thereon;

a primary post having a first end and an opposing free end, opposing first and second side walls disposed in respective planes parallel to said longitudinal axis of said nose pad substrate, and opposing top and bottom walls; said primary post being connected at its first end substantially perpendicular to said mounting surface of said nose pad substrate; said primary post defining a screw hole proximal to said free end of said primary post and extending from said first side wall of said primary post and exiting through said second side wall of said primary post; a left primary channel disposed in said first side wall of said primary post extending from said top wall of said primary post to said bottom wall of said primary post; a right primary channel disposed in said second side wall of said primary post extending from said top wall of said primary post to said bottom wall of said primary post;

a removable secondary post having a first end and an opposing free end, opposing first and second side walls disposed in respective planes parallel to said longitudinal axis of said nose pad substrate, and opposing top and bottom walls; said secondary post being connected at its first end substantially perpendicular to said mounting surface of said nose pad substrate and adjacent to said primary post; a left secondary channel disposed in said first side wall of said secondary post extending from said top wall of said secondary post to said bottom wall of said secondary post; a right secondary channel disposed in said second side wall of said secondary post extending from said top wall of said secondary post to said bottom wall of said secondary post; said left primary channel and said left secondary channel being substantially longitudinally aligned, and said right primary channel and said right secondary channel being substantially longitudinally aligned;

whereby said primary post and said secondary post are capable of securely residing within a receptacle box of a push-on friction fit nose pad arm assembly of an eyeglass eyewire and said primary post is capable of securely residing within a receptacle box of a post and screw nose pad arm assembly of an eyeglass eyewire with said screw hole receiving a screw therethrough after said lower post has been disconnected from said nose pad substrate.

6. The dual-purpose nose pad insert assembly of claim 5, wherein said nose pad substrate, said primary post and said secondary post are integrally formed.

7. The dual-purpose nose pad insert assembly of claim 5, wherein said nose pad substrate, said primary post and said secondary post are manufactured of plastic.

8. The dual-purpose nose pad insert assembly of claim 5, further comprising:
a silicone cover positioned about said nose pad substrate.

9. The dual-purpose nose pad insert assembly of claim 5, further comprising:
score notch means for facilitating disconnection of said secondary post from said nose pad substrate.

10. The dual-purpose nose pad insert assembly of claim 5, wherein said free end of said primary post and said free end of said secondary post are rounded.

11. A dual-purpose nose pad insert assembly, comprising:
a nose pad substrate;
a removable lower post connected to said nose pad substrate; said lower post including channel means for frictionally engaging a push-on pad arm assembly receptacle box; and
an upper post connected to said nose pad substrate adjacent to said lower post; said upper post including channel means for frictionally engaging a push-on pad arm assembly receptacle box concurrently with said lower post; said upper post having an aperture means for receiving therethrough a screw of a receptacle box of a post and screw pad arm assembly with said lower post removed.

\* \* \* \* \*